UNITED STATES PATENT OFFICE.

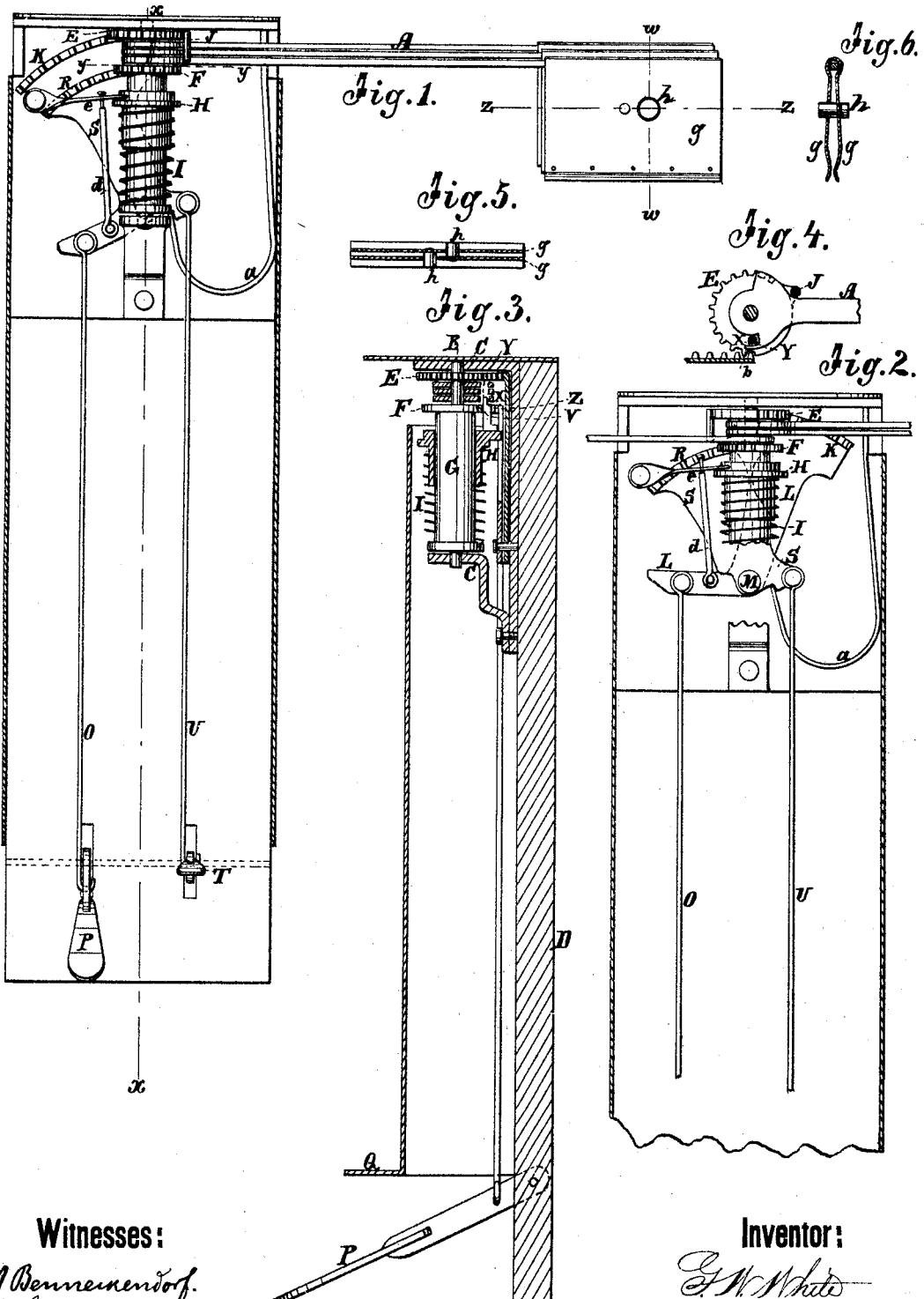

GEORGE W. WHITE, OF BROOKLYN, NEW YORK.

IMPROVEMENT IN MUSIC-LEAF TURNERS.

Specification forming part of Letters Patent No. 140,664, dated July 8, 1873; application filed May 10, 1873.

*To all whom it may concern:*

Be it known that I, GEORGE W. WHITE, of Brooklyn, in the county of Kings and State of New York, have invented a new and Improved Music-Turner, of which the following is a specification:

My invention consists in a series of leaf-turning arms arranged loosely on a pivot at the top of a support adapted to rest on the book-rack of a musical instrument, on which said pivot is a wheel with an arm which acts against all the leaf-turning arms on one side and swings them around to the side from which the leaves are to be turned, when a lever at the bottom of the support, connected with a segment gearing with said wheel, is pressed down by the player; and there is another wheel on said pivot for throwing the arms in the outer direction, one at a time, to turn the leaves, when a similar lever at the bottom of the stand, connected with said wheel by a toothed segment, is pressed down. This last wheel is thrown back by a spring, and the first one is turned back by the last when it throws the first arm. My invention also comprises a spring-clip for the arms to clip the leaves and hold them, so as not to slip out when the arms swing, which is so constructed that it can be opened readily for engaging the leaves by pinching it between the thumb and finger.

Figure 1 is a section of the case inclosing the apparatus, and a front elevation of the latter, showing all the arms turned over to the side from which the leaves are to be turned. Fig. 2 is similar to Fig. 1, showing one of the arms turned over to the left, as when a leaf has been turned. Fig. 3 is a sectional elevation of Fig. 1 taken on the line *x x*. Fig. 4 is a section of Fig. 1 on the line *y y*. Fig. 5 is a section on the line *z z* of Fig. 1; and Fig. 6 is a section on line *w w*.

Similar letters of reference indicate corresponding parts.

A represents the small rods or wires for turning the leaves. They are mounted loosely on a pivot, B, mounted in bearings C at the top of a stand, D, and carrying the toothed wheels E and F, also carrying the drum G, whereon is arranged the sliding collar H and the coiled spring I. The wheel E has an arm, J, projecting from one side at the periphery across the whole series of arms, and it gears with the toothed segment K mounted on one arm of the bell-crank L, which is pivoted to the back of the plate or support at M, and connected at the end of its other arm, by the rod O, with the lever P below the rest Q, for the music-sheets or book of which the leaves are to be turned. The other wheel F gears with a toothed segment, R, on one arm of a bell-crank, S, which is also pivoted at M and connected at the end of its other arm with a lever, T, by a rod, U. V is a pin connected to sleeve H and sliding through wheel F by the action of spring I against the hubs of the arms A, and so that the small projection X on the end will enter the notch Y of the hub or arm against which the pin bears at its shoulder Z, so that it engages the lowermost arm in such manner that when the lever T is pushed down and the segment S swung thereby to the right, so as to turn the wheel to the left, it will carry the arm with which the pin V is thus engaged. The spring *a* throws the segment S and wheel F back again as soon as the lever T is released, ready for the next operation, and the pin V is thrown forward against the next lever by the spring I as soon as the shoulder Z escapes or passes back of the projection *b* at the notch *y* and engages said lever, ready for turning the next leaf when required to do so.

When all the arms have been turned forward to the left they are turned back to be engaged with more leaves by the lever P and segment R, by which, also, the pin V is pulled back out of the way by the rod *d* and bar *e* acting on the sleeve H. This sleeve may extend to the lower end of the shaft or drum G, or nearly so, and have other contrivances for working it.

The spring-clip for engaging and holding the leaves consists of the spring-plates *g* arranged on the arms and set so as to pinch the paper between them, and each having a push-pin or knob, *h*, attached to it and passing through the other, so that, by applying the thumb to one and finger to the other and pressing them in opposite directions, the clip can be opened quickly and easily.

The instrument may be used for turning leaves of books of any kind, as well as music, if desired.

Having thus described my invention, I claim as new and desire to secure by Letters Patent—

1. The combination of the arms A, wheels E and F, the pin J, the segmental bell-cranks L S, and their operating levers and springs, substantially as specified.

2. The combination of the sliding pin V, sleeve H, and spring I with the notched arms A, substantially as specified.

3. The combination of rod $d$ and bar $e$ with sleeve H, spring I, and the mechanism for throwing the arms A to the side for engaging the leaves to be turned, substantially as specified.

4. The combination of spring-plates $g$, push-pins $h$, and arms A, substantially as specified.

GEO. W. WHITE.

Witnesses:
T. B. MOSHER,
ALEX. F. ROBERTS.